United States Patent Office 3,425,747
Patented Feb. 4, 1969

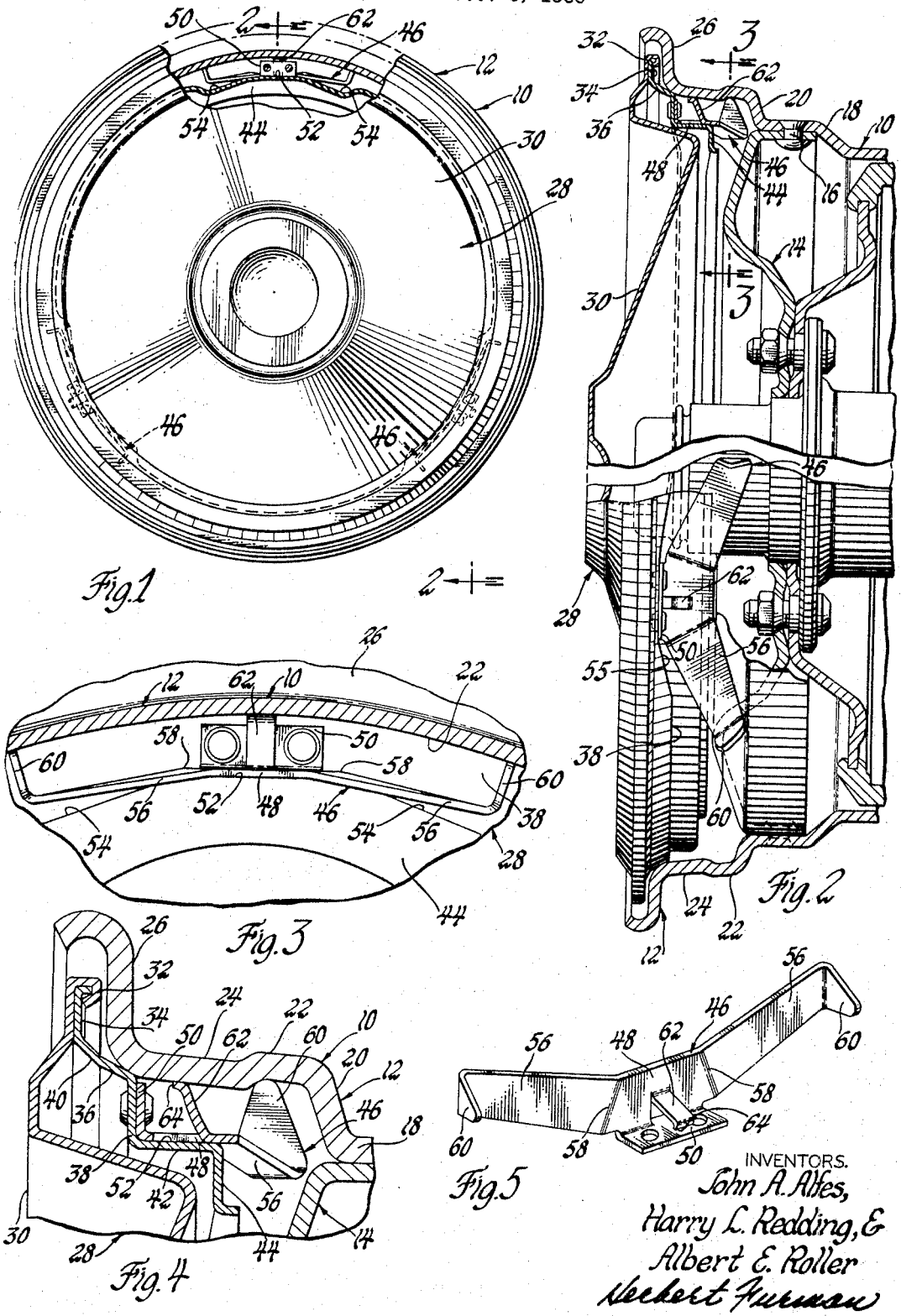

3,425,747
WHEEL COVER
John A. Alfes, Drayton Plains, Harry L. Redding, Pontiac, and Albert E. Roller, Birmingham, Mich., assignors to General Motors Corporation, Detroit, Mich., a corporation of Delaware
Filed Dec. 8, 1966, Ser. No. 600,221
U.S. Cl. 301—37                                                5 Claims
Int. Cl. B60b 7/06

ABSTRACT OF THE DISCLOSURE

A wheel cover includes an annular flange fitting within the wheel rim and mounting a number of retaining members. Each member has a body portion secured to the cover flange and a pair of arms which diverge axially and radially inwardly of the retaining member and engage within a groove within the wheel rim. The arms function only as low rate springs and hold the cover against axially outwardly directed forces. Radially disposed forces are transferred from the wheel rim to the cover by stiff fingers on the retaining members which engage the wheel rim.

---

This invention relates to wheel covers and more particularly to a wheel cover which is self-retained on a vehicle wheel.

One feature of this invention is that it provides a wheel cover having improved retaining means for mounting the cover on a vehicle wheel. Another feature of this invention is that the retaining means includes a plurality of retaining members having arm portions functioning as low rate spring members for holding the cover on the wheel against axially outwardly directed forces. A further feature of this invention is that the retaining means include additional means for piloting the cover within the wheel opening and for transferring radially disposed forces from the wheel rim to the cover. Yet another feature of this invention is that the arm portions extend angularly and axially inwardly of the body portion and circumferentially opposite of each other and are engageable with a tire bead groove of the rim.

These and other features of the wheel cover of this invention will be readily apparent from the following specification and drawings wherein:

FIGURE 1 is a partially broken away view of a vehicle wheel having a wheel cover according to this invention mounted thereon;

FIGURE 2 is an enlarged sectional view taken generally along the plane indicated by line 2—2 of FIGURE 1;

FIGURE 3 is an enlarged partially broken away view taken generally along the plane indicated by line 3—3 of FIGURE 2;

FIGURE 4 is an enlarged view of a portion of FIGURE 2; and

FIGURE 5 is a perspective view of one of the retaining members.

Referring now particularly to FIGURES 1 and 2 of the drawings, a conventional vehicle wheel 10 includes an annular flanged rim 12 and a wheel body 14 which is riveted at 16 to the base flange 18 of the rim 12. The body 14 is bolted to the axle of the vehicle in order to mount the wheel 10 thereon. The rim 12 additionally includes a radially extending, axially facing side flange 20 which joins the base flange 18 to a radially inwardly opening annular tire bead or groove 22. The tire bead is joined to an axially inwardly extending radially facing annular flange 24 which in turn is joined to the lip flange 26 of the rim.

The cover 28 includes an annular cover body 30 which covers the wheel opening and the major portion of the rim 12. The outer peripheral edge of the cover body 30 is crimped at 32 to a radially otwardly extending flange 34 of an annular band or retaining ring 36. The ring 36 is of stepped flange construction and includes a radially extending flange portion 38 joining flange portions 40 and 42, the latter of which terminates in a radially extending flange portion 44. Flange portion 40 engages the shoulder between rim flanges 24 and 26 to locate the cover 28 axially inwardly of the wheel.

The cover 28 is mounted on the wheel 10 by three generally equally spaced retaining members designated generally 46. These retaining members are of like construction and, accordingly, only one will be particularly described. As shown in FIGURES 3 through 5, the retaining member 46 includes a body portion 48 having extending therefrom an apertured flange 50. The flange portion 42 of the retaining ring includes a flat seat or mounting portion 52, FIGURE 1, which is offset radially inwardly of the normal surface of flange portion 42 and which merges on each side thereof into a recess 54. The recesses 54 are offset further in a radially inward direction than the seat 52. In the areas of each seat 52 and recesses 54, the flange portion 44 is of lesser extent than normal since it extends from the radially inner edge thereof only to the seat and recesses.

When the retaining member 46 is assembled to the cover, the body portion 48 of the retaining member seats on the seat 52, as shown in FIGURES 3 and 4, and the flange 50 seats against a seat of a recess 55 in the flange portion 38 of the retaining ring, as shown in FIGURE 2. Flange 50 is riveted or otherwise secured to the seat of recess 55 to mount the retaining member 46 on the cover.

Extending from the body portion 48 are cantilever arms or arm portions 56 which extend angularly from the body portion in an axially inward direction and which further extend circumferentially opposite of each other when the retaining member 46 is mounted on the cover. The arm portions 56 are joined to the body portion 48 across oppositely angled juncture portions 58 and are therefore slightly offset axially and radially inwardly of the body portion, as can be seen in FIGURE 3.

Each of the arm portions 56 terminates in a radially outwardly extending finger or retaining portion 60 which includes a curved edge engaging the axially outer wall of the tire bead 22 to mount the cover 28 on the wheel 10.

The arm portions 56 are arranged to function as low rate spring members and, accordingly, only hold the cover on the wheel body against axially outwardly directed forces.

In order to pilot the cover 28 within the opening of the rim 12 and to also transfer radially disposed forces from the rim to the cover, each of the retaining members 46 is provided with a lanced generally radially and axially outwardly extending tab or finger 62 which terminates in a return bent bead or curl 64 which engages the flange 24 of rim 12 when the cover 28 is mounted thereon. The fingers 62 are stiff and will yield only slightly in a radial direction. Thus, in service, as the rim 12 becomes out of round, the fingers 62 transfer the resultant radially disposed forces directly from the rim 12 to the retaining ring 34 of the wheel cover.

Normally in a wheel cover having retaining members of the general type as members 46, these members must transfer both axially directed forces and radially directed forces to the cover member. Accordingly, the arm portions of these members must be exceedingly stiff in a radial direction in order to retain the cover on the wheel. By providing the fingers 62 which are separate from the arm portions 56, the cover of this invention allows the arm portions 56 to function as low rate spring members so that it is very easy to both apply and remove the cover 28. By further angling the arm portions 56 relative to the body portion 48 in a radially and axially inward direction with respect to the cover 28, the ease of applying the cover and removing the cover is increased.

While three retaining members 46 are shown, more may be used if necessary or desired. Test results have shown that three is the optimum number since this results in the arm portions 56 of all of the retaining members being equally loaded in service.

The recesses or offsets 54 ensure that the arm portions 56 can bend or yield relative to the body 46 about the junctures 58 as required and that no back-up or reinforcement for these arm portions results. Accordingly, the arm portions 56 can function as low rate spring members without interference.

Thus this invention provides an improved wheel cover.

We claim:

1. In combination with a vehicle wheel including an annular rim portion provided with a generally radially inwardly opening groove, a wheel cover comprising, a cover member having an annular generally axially inwardly extending flange portion located in spaced relationship to said rim portion and terminating axially outwardly of said groove, a retaining member including a body portion secured to said flange portion and having a pair of resilient arm portions extending angularly axially and radially inwardly of said body portion and circumferentially opposite of each other, each of said arm portions functioning as a low rate spring and including means at the free end thereof engaging said groove to hold said cover on said wheel against axially outwardly directed forces, and means on said body portion engageable with said rim portion to pilot said cover member within the opening of said rim portion and transfer radially disposed forces from said rim portion to said body portion.

2. The combination recited in claim 1 wherein the cover member flange portion includes a seat for the retaining member body portion and a recess located to each side of said seat to permit each of the arm portions to flex relative to said body portion without interference by the cover member flange portion.

3. The combination recited in claim 1 wherein the means on the body portion includes a stiff pilot member engageable with the annular rim portion of the wheel axially outwardy of the groove.

4. The combination recited in claim 1 wherein the means on the body portion includes a lanced axially and radially outwardly extending portion of the retaining member body portion slidably engageable with the annular rim portion of the wheel axially outwardly of the groove.

5. In combination with a vehicle wheel including an annular rim portion provided with a generally radially inwardly opening groove, a wheel cover comprising, a cover member having an annular generally axially inwardly extending flange portion located in spaced relationship to said rim portion and terminating axially outwardly of the groove, a retaining member including a body portion secured to the flange portion and having a pair of resilient arm portions diverging axially and radially inwardly of the body portion and joined to the body portion by juncture portions which converge axially with radially inwardly of the cover member, each of the arm portions functioning as a low rate spring and including means at the free end thereof engageable with the groove to hold the cover on the wheel against axially outwardly directed forces, and means on the body portion independent of the arm portions engageable with the rim portion to pilot the cover member within the opening of the rim portion and transfer radially disposed forces from the rim portion to the body portion.

References Cited

UNITED STATES PATENTS

| 2,712,474 | 7/1955 | Gaylord | 301—37 |
| 2,857,208 | 10/1958 | Lyon | 301—37 |
| 2,921,815 | 1/1960 | Lyon | 301—37 |
| 2,942,916 | 6/1960 | Lyon | 301—37 |
| 3,037,816 | 6/1962 | Mulhern | 301—37 |
| 3,199,921 | 8/1965 | Boroday | 301—37 |

RICHARD J. JOHNSON, *Primary Examiner.*